United States Patent [19]
Colvill et al.

[11] Patent Number: 5,521,722
[45] Date of Patent: May 28, 1996

[54] IMAGE HANDLING FACILITATING COMPUTER AIDED DESIGN AND MANUFACTURE OF DOCUMENTS

[75] Inventors: Robert H. Colvill, Surrey; Derek R Lowther, Hampshire; Colin N. Shenton, Surrey; Robert T. Shillito, Somerset; Rosemary Trinder, Suffolk; Andrew F. Wallis, Bath, all of England

[73] Assignee: Thomas De La Rue Limited, London, England

[21] Appl. No.: 890,583

[22] PCT Filed: Jan. 31, 1991

[86] PCT No.: PCT/GB91/00143

§ 371 Date: Jul. 13, 1992

§ 102(e) Date: Jul. 13, 1992

[87] PCT Pub. No.: WO91/11877

PCT Pub. Date: Aug. 8, 1991

[30] Foreign Application Priority Data

Jan. 31, 1990 [GB] United Kingdom ............ 9002138
Aug. 17, 1990 [GB] United Kingdom ............ 9018108

[51] Int. Cl.$^6$ ............................................. H04N 1/46
[52] U.S. Cl. ............................................. 358/500; 358/402
[58] Field of Search .................... 358/540, 402, 358/450, 400, 500, 443; 345/200

[56] References Cited

U.S. PATENT DOCUMENTS 4,357,624  11/1982  Greenberg .......................... 358/22
4,800,380  1/1989  Lowenthal et al. ................. 345/200
4,941,057  7/1990  Lehmbeck et al. .................. 358/443

FOREIGN PATENT DOCUMENTS 2180427  3/1987  United Kingdom .

OTHER PUBLICATIONS

MicroBRIAN Resource Manual Part Two, pp. 16–22, 33 and 85–89.

Primary Examiner—Stephen Brinich
Attorney, Agent, or Firm—Oliff & Berridge

[57] ABSTRACT

Apparatus for handling digital representations of documents which are to be provided with a number of images. The apparatus comprises a first store for storing digital data defining the image content of each pixel of each image and a color generator for generating data defining, independently of the image contact data, the color of each pixel of each image or combinations of images as defined by a user. A processor selectively combines the image content data and the color data to enable selected images to be viewed separately or in combination as allowed by the layering structure provided.

39 Claims, 4 Drawing Sheets

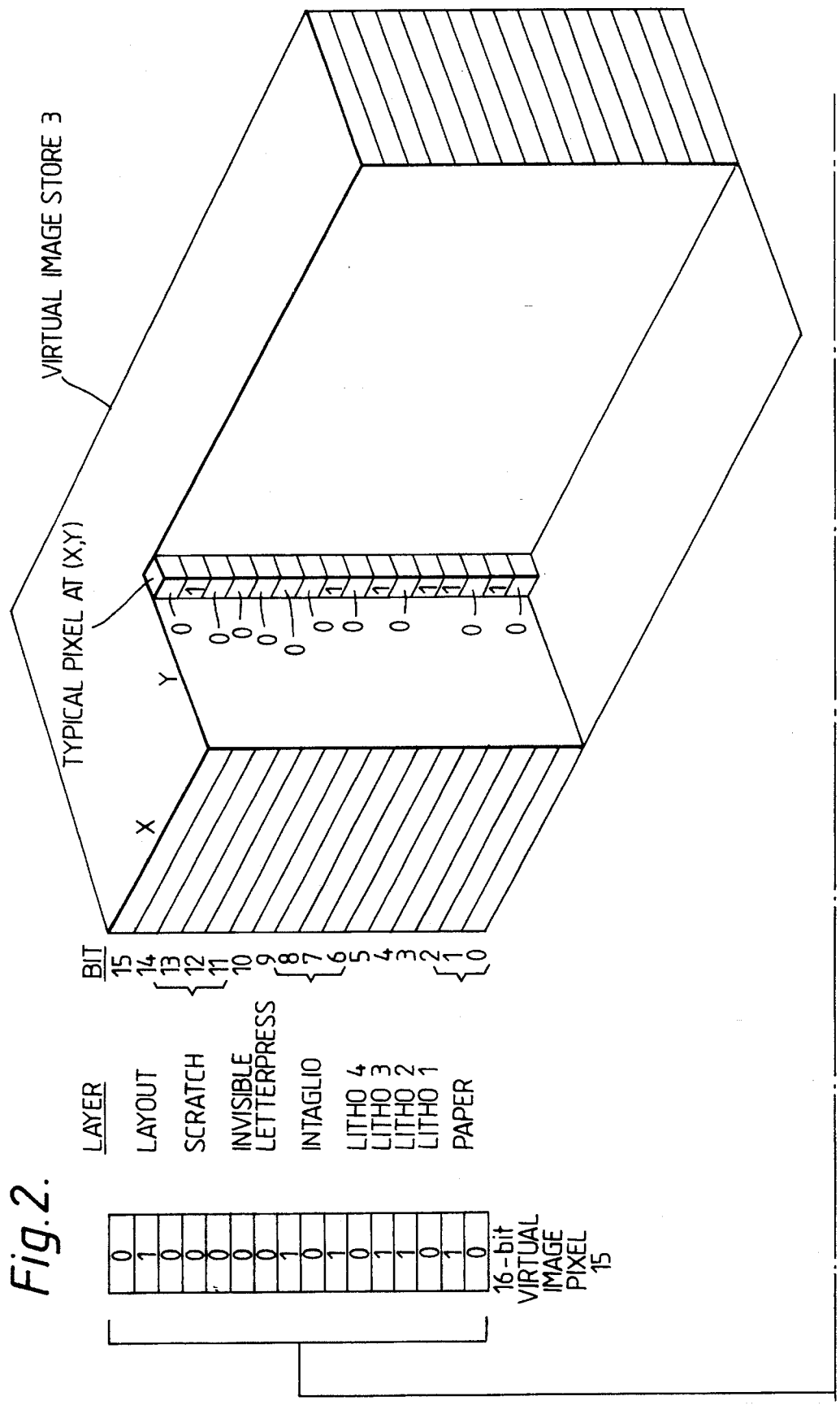

IMAGE HANDLING FACILITATING COMPUTER AIDED DESIGN AND MANUFACTURE OF DOCUMENTS

BACKGROUND OF THE INVENTION

The invention relates to methods and apparatus for handling digital representations of documents for example to allow sophisticated computer aided design and manufacture of a security document.

Conventional commercial colour proofing relies on the proofing media having yellow, magenta, cyan and black halftone screened colour separations which match the YMCK inks that will be used for printing. Each ink naturally has to be applied from a printing plate which contains the Y, M, C or K information.

The proofs are generally made by exposing Y, M, C and K photosensitive media to the corresponding photographic halftone colour separations, using a contact printing method. The individual colour layers are then mechanically overlaid in register.

Computer generated proofing methods are available for commercial work. One method requires Y, M, C or K halftone photographic separation films to be made which are in turn used as masks for contact imaging or proofing media. Another method exposes three or four colour sensitive media.

Problems arise with the printing of security documents. Firstly they involve different types of printing processes in the manufacture of any one document whether, say, a banknote, passport or identity card. Secondly usually one of the printing processes is different from those generally used in the printing industry or is conducted in an unusual manner e.g. intaglio printing. The printing methods often apply images only with a partial contact of the plate (such as through the use of schablones) or the inks are delivered in a special manner such as by rainbow printing from split ducts.

It is important to appreciate that most security documents are printed in continuous tone often using continuously blended colours, the blending occuring only on the ink train of the press. Security documents often make use of fine line patterns, some delivered in such "rainbow" printing fashion.

In contrast conventional full colour printing (e.g. magazine printing) will take a colour original, colour separate that, convert it into a halftone format and then print with the three subtractive colours and black. These subtractive inks are printed at full density or not at all (ie. they are not printed at continuous density levels) and their overall appearance depends on the eye blending together interspersed finely divided areas of the subtractive colours and black to give the perceived colour. This combination thus creates the perception of the original. It is however an illusion, generally unacceptable in security printed items.

Although not generally noticeable to the naked eye there has to be a sacrifice of the ultimate level of resolution because of the screening process. While coarse colour pictures of bank notes could be attempted this way, they would not survive customer's inspection and it is extremely important that the proofed security document should have a resolution similar to the final article—which will be much better than half tone processes allow. It is also important to remember that the inks delivered to the security document are not selected from four or six pots and only delivered in those colours. Rainbow printing blends the colours on the press to give continuous hues as well as continuous density.

The methods and materials used in the security printing industry are such that genuine documents can be verified such as by visual or machine authentication methods, and counterfeits or forgeries detected. The computer aided design system employed for security documents must be capable of providing visual representations to an unprecedented degree of accuracy of colour and resolution so that proofing prints can approximate more closely to the manufactured counterpart. In particular the design system must be able to simulate the effect of rainbow printing. Additionally it is highly desirable that the design system is able to provide visual indications of the placement of special markings such as invisible but ultraviolet revealable inks and magnetic inks.

For example a typical banknote will be printed to give a notional printing structure of [from the front face downwards]:

|  |  |
|---|---|
|  | Serial numbering; monochrome or multicolour/letterpress; |
|  | Security design; rainbow, monochrome or multicolour/intaglio; |
| FRONT FACE | Security design; invisible fluorescent/litho or letterpress; |
|  | Security design; rainbow or monochrome/litho; |
|  | Security design; rainbow or monochrome/litho; |
|  | Security design; rainbow or monochrome/litho; |
| . . . | Security design; rainbow or monochrome/litho; |
|  | Base paper with optional watermark, threads, |
| . . . | marking fibres; |
|  | Security design; rainbow or monochrome/litho; |
| BACK FACE | Security design; rainbow or monochrome/litho; |
|  | Security design; rainbow or monochrome/litho; |
|  | Security design; rainbow or monochrome/litho; |
|  | Security design; invisible fluorescent/litho or letterpress; |
|  | Security design; rainbow, monochrome or multicolour/intaglio. |

The printing impressions are placed in the above sequence from the base paper outwards. There need be no overlap of one impression on another as often only portions of the note are printed with a given plate. Typically six litho workings will be applied to the document. Finally the serial number is added by letterpress.

In practice there may be between two and eight lithographic impressions, up to four on each side. Cheques and other security printed items need not be printed by intaglio but generally will have at least three ink impressions on one side.

The intaglio impression on each side is generally a single impression and one plate is used. This plate however is selectively inked by the use of areas termed "schablones" which need to be cut to size according to the colour to be delivered to the design feature. These schablones may supply monochrome, multicolour or rainbow coloured ink.

Computer aided design systems which could hitherto be applied to security printing have been limited in usefulness being object or vector based. Vector based systems are very useful for producing a component of a complete document design such as complex line patterns. Vector based systems do not readily extend to the introduction of a variety of colour changes with a given mathematically constructed feature nor can they be useful for creating images of a complete document.

The LaserScan High Resolution Display device is a vector operated system in which complex line images are written by a laser onto a photochromic film which becomes opaque where the laser strikes it. The resulting image is then projected onto a screen for viewing; the image is not displayed on a CRT screen at that resolution. Such systems are commonly used in present day security document design and any new design system has to be able to import vector patterns from it.

In object based design systems the user specifies the composition of the image as a series of objects such as lines, circles, polygons which are assigned a position, size and colour. The objects can be manipulated singly or in groups and ranked according to whether they are to appear behind or in front of one another. To display the image the attributes of each object are processed though a programme which computes the colour to be assigned to each pixel of the display, loading the appropriate numbers into the framestore.

Object based design systems have the disadvantage that they do not provide the artist with natural working methods; they cannot work with scanned images and the refresh time for complex images is long.

SUMMARY OF THE INVENTION

In accordance with the present invention, apparatus for handling digital representations of documents which are to be provided with a number of images comprises a first store for storing digital data defining the image content of each pixel of each image; colour data generating means for generating data defining the colour of each pixel of each image or combination of images as defined by a user, independently of the image content data; and processing means for selectively combining the image content data and colour data to enable selected images to be viewed separately or in combination.

We have devised a new apparatus for handling security documents which enables these documents to be designed easily while also enabling proofs to be obtained or selected parts of the security document images to be otherwise displayed. This is achieved primarily by handling the image content data separately from the colour data. This not only enables individual images or layers to be separately displayed but also enables selected images to be combined for display and in particular enables in certain applications the colour data to be fixed relative to the document while permitting an image to be moved relative to the document so that the colour of the image will vary depending upon its position on the document.

The apparatus allows the formation of accurate proofs of all the stages of banknote printing, so that the sequence of design build up can be seen and if necessary used as a control during preproduction or to show to the customer.

The ability to prepare precision proofs so quickly has a major commercial benefit. Design origination in the traditional sense is very time consuming and the new design apparatus allows origination to occur very much more quickly.

In the security printing industry it is often necessary to manufacture printed items in which the register between various printings can be maintained through a printing run more accurately than is possible with commercial equipment. Thus for example if three lithographic images are to be printed in register on one side of a document, each having a different colour (including rainbow colour) precise registration can be obtained by using a specially designed printing machine which allows each of the three images to be placed on a single offsetting blanket. This blanket then transfers the three images to the substrate. In contrast most commercial offset lithographic printing equipment would have to use three offset blankets i.e. using three separate printing stations which is less accurate.

It is usual in the security printing industry to employ a press which prints images on both sides of a document at the same instant by providing that instead of each opposing blanket having its own impression cylinder that the two blankets directly oppose each other. This allows very fine registration tolerances to be maintained for example to allow the printing of both duplex effects and see-through features.

The invention enables these special features to be achieved. It may further provide tolerance parameters such that the designer can view the document when layers move laterally within their tolerance bands. The effect is achieved by causing the specified image or images to be displaced relative to the frame of image reference.

The present invention provides a high resolution design system suitable for security document design which takes into account the special methods, materials and effects used in the security printing industry, which allows more accurate colour proofs to be obtained than hitherto. The system may also incorporate limiting parameters resulting from the constraints imposed by the particular print manufacturing to be used in production.

The present invention can employ the use of a modified "paint" system with the advantage that the designer uses electronic controls which simulate normal drawing and painting tools. It also provides the ability to work with scanned in images including those from vector systems and provides subtlety of results.

In paint systems the designer is provided with a range be of drawing "tools" which closely resemble their traditional counterparts and offer working methods which directly relate to normal creative practice. For example the user can use different brush sizes and load the selected brush with a colour mixed to the designer's precise requirements. In one application of this invention by moving the stylus across the tablet colour is loaded into every cell of a colour store along the path of the stylus while the image content information is loaded into the first store and the result is immediately displayed on the screen. If a mistake is made the brush can be loaded with a background colour and the error painted over. It also allows the possibility of altering or moving one image with respect to others while maintaining colour registration. Present systems do not allow this.

The first store may contain one binary digit defining the image content of each pixel of each image. Thus, in this case, the image content is defined in terms of an "on" or "off" signal indicating for example whether or not ink is to be printed within that pixel. Alternatively the first store may assign one of a series of permitted levels of signal indicating ink density. This is particularly useful for intaglio impressions. In other applications some layers can have an on/off capability and the others multi-level.

In yet other applications where there may be more than one colour in any single layer eg intaglio or paper there needs to be a further bit/s per pixel to identify which colour of the available colours for that layer to apply to that pixel. Alternatively this may be done by referencing the coordinates of a given pixel to a colour data array of similar dimensions.

Typically, the colour data generating means comprises a look-up table which has an address corresponding to each possible combination of images and contains at each address colour data defining the resultant pixel colour.

The look-up table will be loaded dynamically in accordance with the colours of the images of the document being designed so as to store at each address the resultant colour, for example directly in terms of red, green and blue (RGB) colour component values, or indirectly as a colour number, which is achieved when the selected image or combination of images is viewed.

As mentioned above, one important application of the apparatus enables images to be moved relative to the colour(s) of the layer concerned. Furthermore, the colour across the document can vary independently of the image. In effect when considering a printing operation involving a printing cylinder and an ink delivery cylinder, the image content data represents the surface of the printing cylinder and the colour data represents the ink variation across the ink delivery cylinder (although the colour date can also represent rainbow effects).

Preferably the colour data generating means is adapted to generate colour data for at least one image which varies with position in one direction across the document. For example, the colour data generating means may be adapted to generate colour data for at least one image which varies with position in orthogonal directions across the document In general, colour data can be stored as follows:

1 In terms of a colour being assigned to a layer such that any image present on that layer will adopt that colour. This is coordinate independent and could be used for example for a single colour letterpress layer;

2 In terms of a colour being assigned to image content within a layer such that one coordinate of the pixel is taken and that is compared with the colour data. While this could be used to cause a layer to have a single colour by assigning all positions to the same colour this type of linear colour assignment is very useful for representing rainbow banding effects. Thus if colours could be assigned to all x-coordinate values, a first set of values could be assigned to a first ink colour (being the pure ink colour). Within the band a number of pixels would be assigned to cover the width of the band and colours calculated by taking the relative contributions of the first and second colours weighted by their position in the band to provide a range of blended colours. The next set of pixels would be assigned the second ink colour.

Although a linear array could be employed such that each coordinate had a specified colour held in the data store, an alternative permitting data compression is to provide a subroutine in which if the coordinate value fell within certain limits it would be assigned the first or second ink colour value, leaving the precalculated blended colours as data points. As a further alternative the colour for each point in a blend could be calculated each time it was needed but this is likely to be slow.

3 Such that colours are assigned on an array basis, taking into account both positional coordinates. While theoretically every pixel could be assigned its own colour the array will have particular use in enabling schablone inking areas to be defined on an area basis. The schablone colour assignment may be made by selecting a colour and assigning that into the colour array based on geometric criteria (such as everything within a given square being that colour) or by using a painting method such that the array is given colour corresponding to the area which the designer has chosen with an electronic "paintbrush". Alternatively procedures may be employed to determine colour based on area instructions.

For example a composite image of say characters making up the denomination of a bank note may have a diagonal boundary running across the numbers and intersecting at least some with the number on one side of the diagonal being represented in one colour and another on the other side. This would be printed using schablones which apply ink to adjacent portions of the number engraving on the intaglio plate, there being a small degree of overlap on the diagonal line. The example of the computer aided design system just designed would simulate this by having areas corresponding to the schablones assigned to the two colours such that any image pixel would take the colour of its position.

In all of the above it will be common to use colour data (including colour number data) which corresponds to previously analysed production inks i.e. where the inks have been colour analysed into R, G and B values, each typically in the range of 0–255. The designer however may choose to synthesise inks for example by using a colour blending routine in which two colours can be gradually mixed, selecting a particular colour. Alternatively the designer may alter or create colours by manipulating the R, G, B values.

The synthesised and calculated colours will often be non-standard colours and it is often necessary to provide approximating routines because the monitor display or the proofing printer can only adopt a reduced number of options.

If necessary there may be provided a reduced number of colour points being a factor of the image content points and a concordance routine provided.

Because the density range of intaglio inks is greater than that possible with lithographic inks there may be more than one bit assigned to image content, for example three bits. This allows the possibility of some apparent reduction in image density. Thus while bits indicating full density will adopt the full strength colour, the scaling down will mean the colour will be reduced in intensity according to the image content weighting. Thus if the image content was a half the R, G and B values for that would each be halved and that colour or the nearest permitted used.

The above methods may be employed for the assignment of colours for individual images. When combined images are to be viewed then two or more layers need to be added. If the image content is merely side by side with no overlap then each image will adopt its own colour.

If the images overlap then generally there are two options. The first is that one layer, usually the upper layer will take absolute precedence over the other layer on a pixel by pixel basis. This will mean that the composite image will take the colour of the upper layer. This precedence will take effect when intaglio or letterpress inks are uppermost as they are opaque inks.

The second option is where one transparent colour (e.g. lithographic) is printed over another. In this case a translucency weighting factor parameter may be defined in the system such that the net colour displayed where the two colour overlap is the weighted average of the R, G and B values (or nearest equivalent permitted colour) of the overlapped images.

In the case of rainbow blends in two or more the lithographic layers the net colours (or nearest equivalents) need to be calculated taking account of weighting factors.

In addition to storing principal colour (e.g. pure ink) values if necessary by colour number requiring the presence of a concordance look up table the system may also hold a store of the derived colours (or permitted equivalents) so that when composite image displays are created the blended colours are immediately available from a data store rather than having to be calculated each time a reference is made.

An alternative method of storing the colour information is described below in connection with FIG. 2.

A particular attribute of the system is the ability for a composite image to be displayed and for the designer to be able to alter say the colour and position of one image within the whole display while allowing the other images to be unaltered. Thus the designer may be able to move one of the lithographic images against its fixed rainbow background while leaving the other images (those in other layers) untouched. Alternatively the designer may leave the image fixed and move the position of the rainbow band with the system displaying the net effect either in that layer or in chosen composites.

The system will generally hold a set of RGB data corresponding to the normal inks used in production. While approximations of the colour especially blended colours may be employed for screen display the system has the ability to store absolute RGB values such that these values are used separately approximated for screen display and conversion to the colour proofing colours.

While normally visible colours will be accurately represented the system must also allow for secondary features to be represented. Thus printed invisible fluorescent ink images may be represented in the image content layer for that image and assigned either the fluorescing colour or a representative colour. Only when that image layer was called for display would the image be shown.

For materials which have a visible appearance and a secondary effect such as a magnetic effect, there may be provided a further data store for the special effect in which the effect colour printed can represent any real colour resulting from the effect or representative colour which is intended simply to show the location of the hidden feature.

Watermark images may, like intaglio images, be given a multiple level capability for example to make part of the watermark darker than the base paper and part lighter.

It is convenient to design one face of a banknote using one set of layers and to design the other face using a fresh set of layers, allowing of course for a common layout and paper (including watermarks and threads) and if necessary lateral image reversal to allow accurate registration of see-through features, etc.

For the design of some faces of a bank note it is appropriate to allocate two bytes per pixel.

The bits may be allocated as follows:

| BIT | Layer | |
|---|---|---|
| 0 | Paper | Background image (tint) |
| 1 | Paper | Watermark/Thread image |
| 2 | Litho Ink 1 | Design element image |
| 3 | Litho ink 2 | Design element image |
| 4 | Litho ink 3 | Design element image |
| 5 | Litho ink 4 | Design element image |
| 6) | Intaglio | Design element image |
| 7) | | -multilevel |
| 8) | | |
| 9 | Letterpress | Serial number image |
| 10 | Letterpress | Invisible Fluorescent image |
| 11) | Scratch | Working/import layer |
| 12) | | |
| 13) | | |
| 14 | Layout | Document dimensions, feature positions, outlines etc. |
| 15 | Unassigned | |

The system may be designed to allow the scratch layer to be the one in which most image manipulations are conducted. The scratch layer may import rastered images from a data library, an image scanner, a desktop publishing system or another image creation system. The scratch layer may be operated in bilevel mode where image content is either present or not or it may be operated in multilevel mode corresponding in the above example to the intaglio image levels.

Generally the scratch layer is used for the working of an image i.e. defining the image content and colouring, but that colour and image content information is usually stored at a specified destination layer e.g. lithographic layer 1.

Vector data such as that arising from a high resolution vector design device may be imported into a scratch layer which may be operated in a vector mode. Any changes to the detail of the image will mean that the designer will have to use the modified raster form rather than being able to utilise the vector data itself. In some applications this of course will be acceptable.

It is, however, possible for the designer to carry out mathematical transformations to the vector image, which transformations may be also created in the vector output system by passing appropriate commands or data to the vector output driver microprocessor. Examples of transformation include translation, rotation, scaling including differential scaling, windowing or masking in which a vector defined closed shape is created and image content within or outside that area is used; kaleidoscope e.g. in which a circular segment subtending an angle which is a whole number factor of 360 degrees is mirrored at a given angle and this effect is repeated to complete a whole circle; distortion including rectangle to quadrilateral for example to provide a simulated perspective effect and including also complex distortion in which say a rectangular grid is changed to a distorted grid by moving individual grid points and applying a smoothing function, giving a 'rubber sheeting' effect; and stepping and repeating including multiple copying of a set of vectors into rectangular, polar and spiral arrays and into other user-defined arrangements such as sine wave, with or layer without rotation of the basic module.

The image created by the vector pattern will eventually be converted by a subroutine to the raster equivalent at a resolution corresponding to the number of pixels in the image content store. This raster equivalent will often be unmodified in shape by the designer who will simply choose to position and colour the image, so as to be able to revert back to the original vector data if a platemaking image is needed.

The layout layer allows the designer to specify the document dimensions, registration, feature outline positioning, and lines about which colour changes will occur. This information may be automatically transferred to all of the other layers so that, say, the border of the document may clearly be defined without borders having to be created in each layer. The borders of the document will fall within the confines of the pixel array or may coincide with it. There may be an even border of pixels provided around the document which are not used for the design. Within the confines of the edges of the document there may be also provided notional margins on at least one pair of opposing sides within which the major design elements are confined.

After setting, these margins may be applied to a set of other layers and if the margins are permitted to move those in the set automatically follow. A screen display which is not necessarily printable may indicate to the designer where the extremities are and whether the limits are being exceeded.

The layout layer may hold registration marks which mark the centre of the document but when a proof of a complete document is to be made any images such as centre marks associated with the layout layer will have been used to create the dimensions of the document being displayed.

To view a layer either the data corresponding to that layer can be displayed (duly converted to the output format) or it can be displayed from the scratch layer. Two or more layers may be displayed to provide a composite image such as the tinted paper base layer and the serial number layer. Alternatively all of the lithographic layers may be represented together. If it is necessary to work on one of these layers then the image content and colour data can be transferred to the scratch layer and when complete further saved.

The composite document may be displayed by combining Bits 0 to 9 in the above example. The scratch layer would not normally be displayed unless a layer had been transferred to it to be worked on. The layout layer may be displayed as it will hold centering marks, ruling lines and the like.

The invisible fluorescent ink marking may be displayed by turning on Bit 10 and either displaying that with the other layers or on its own.

Using a reversal routine one or more images may be turned so as to represent the view from behind and this reversed image data may be saved and then recalled to be assigned to say Bit 15 so that the design of the second face of the note can take into account any registration needed from face 1 to face 2.

The apparatus may also incorporate procedures which provide general background indicia which extend from the body of the design into the margin areas. Additionally, the background indicia or a continuous design element may extend to the border of the document, continuing on to the next document. The apparatus of the invention may allow such continuous design elements to be shown running over the borders and exhibiting the faces of adjacent notes. Additionally the system may automatically cause a continuous design which terminates at the upper border of a document to be automatically continued at the bottom of the note in "wrap around" manner. The design may be positioned horizontally or vertically and procedures supplied to cause the other face of the note to be presented with the continuation of the image.

This facility allows the designer to see what effect cutting of the printed sheet into individual documents will have and whether the design is maintained visually. While this run-off may be exhibited on the screen, the designer may simply display and print only that portion of the design falling within the edges of the document.

A further software procedure may allow an array of abutting documents to be exhibited so that a clearer impression of the printed web at various stages may be given. In order to display an image of a layer, the virtual image data for that layer containing image content information referenced by layer number and coordinate position must be accessed, if necessary by sampling. If there is no image content in the sampled pixel then that information is transferred to the display. The phosphor equivalent RGB display is made at that position on the monitor's screen.

If there is image content then by use of the layer number and the coordinate position of that pixel, the colour store may be accessed.

If a layer or combination of layers is to be electronically proofed then the colour value for that pixel is translated to a combination of yellow, cyan, magenta and black proofing inks, each deposited within a pixel area at within a range of levels ranging from zero (meaning none) to twenty or more.

The correlation may be made by taking the colour for that pixel and using the colour number obtaining equivalent yellow, magenta, cyan and black data which is sent to the ink jet printer at the time of proofing. If necessary the specified colour number may be correlated with permitted output values.

If multiple layers are to be printed then the layers are first identified. The system then establishes whether there is image content present. If there is no image content in any of these layers then no colour value need be determined or a zero value entered.

Taking a simple case of two layers having possible overlap, the image content of a given pixel if not zero may be of the under layer or the top layer or both. If either the top or the under layer on its own then the determination of colour is straightforward.

Where the two colours overlap the system may allow the upper colour to take absolute precedence over the lower one, that is simulating an effect where say a letterpress ink was printed on top of a lithographic ink, or a proportion of the colour of the lower ink may be combined with the colour of the upper ink to provide a new colour value. This simulates the effect of printing one transparent e.g. lithographic ink over another. The weighted calculation may be undertaken by taking the RGB values of the first colour and combining with a proportion of the RGB values of the second colour.

This derived colour value may then be translated into a permissible colour number for the system to use. Similarly for proofing the individual yellow, magenta, cyan and black values may be calculated.

Thus the colour of a given image pixel may be determined by using simply the layer number if all of the images within that layer may have only one colour. Alternatively the colour of a layer may be constant but the colour data may be held as a linear array having a dimension corresponding to the number of pixel points available on that axis. Each of the points of the linear array may be assigned the same colour. Alternatively a two dimensional array of points corresponding to the number of image pixels may be provided, each of the colours in the array being set to the predetermined value.

A routine is then provided such that the colour of a pixel is determined by reference to x, or y, or x and y coordinates.

The designer may change the colour for each point, be linear array or two dimensional array by choosing another colour. Generally the designer will be provided with a series of preselected colours, defined as colour numbers which are correlatable to a table of 'absolute' red, green and blue values obtained by colour analysis correlatable with the printing inks to be used. Derived principal colours may be calculated by combining the respective RGB values of, say, two principal colours in controlled manner to provide the derived RGB values which in turn may be assigned a colour number. To maintain a reference of prime colour values, it is desirable to store the derived RGB values in that form so as not to lose colour information from the storage data. By the above means a series of colours can be defined in RGB terms and assigned.

Similarly when the proofing is to occur the colour number from the colour data stack or the absolute levels of RGB components need to be converted by a subroutine to equivalent subtractive colour values.

Again approximation may need to be employed because of the limited number of colours printable using the permissible combinations of inks from the proofing printers.

In addition to the principal colours and derived colours, the system may also hold alternative colour data for any layer or part of layer such as to indicate the effect of special materials. For example an invisible but ultra violet revealable dye would have no colour assigned in the primary colour store but, if it fluoresced blue, a blue colour in the second (alternative) colour data store. A photochromic ink would have its normal colour assigned in the primary colour store and its photochromically activated colour in the second store. A magnetic ink would have its true colour shown in the first colour data store and simply an identifying colour in the second data store which would indicate where magnetism was present.

The first and second colour data stores will have layer and generally positional referencing and they may be combined. Alternatively, there may be two separate data sets. In order to select either the first or the second colour the image content store may additionally include a pointer as to which colour to employ.

While the system has the inherent capability of working with a wide range of R, G, B values including where the designer may wish to define colours by choosing R, G and B values, in practice the present limitations of RGB phosphor displays and yellow, magenta, cyan and black proofing inks mean that approximations have to be employed. The approximation may be made by reducing the number of colour number options in the colour data store or providing display or proofing.

In practice, the colour monitor may display two hundred and fifty six (256) colours and the colours in the data stack need to be reduced to that number by approximating, i.e. ascertaining whether colours are precisely those permitted or whether they simply fall within a group within which all members are assigned a unique number. This unique number may be used as a reference to change the colour in the data stack to the approximated colour if necessary or an approximated colour data store may be created.

In general, any particular display device will be unable to display all possible colours which can be printed. Preferably therefore the processing means includes means for adapting the combined image content and colour data for use with a display device.

For example, the adaption means may comprise a look-up table for storing control values suitable for use with the display device, the look-up table having an address corresponding to every possible combined image content and colour data value.

In those cases where the images are printed, the digital data may represent printing ink density. In addition image data sets representing base paper (including a watermarks, security threads etc) will also be stored. The image data set representing the paper may use more than one bit per pixel to allow normal, darker, lighter shades and security threads to be represented. The term "image" should be taken to mean the individual components which are to be inked etc. Thus in the case of the special offset lithographic effect where three images say are delivered onto a common blanket each of the components would be regarded as an image (having its own layer). The composite image delivered from the common blanket would not be regarded as an individual image although it is applied during one print cycle. The term "image" should also be taken to cover any basepaper tint, watermark or thread etc. in the paper and the serial number (and indeed any label of hot stamped foil which is attached.)

The representation of each layer digitally and in pixel form thus separately allows a number of significant applications and processes to be achieved in design and manufacture which provide a significant advance on the art.

The apparatus allows the designer rapidly and with high quality to create designs by using computer simulations of the construction methods traditional in banknote design and to be able to view these on the screen and modify them if necessary. Individual layers or images can be manipulated without overwriting other layers. Colour proofing prints may be generated at various stages. Individual layers (or their raster origin or vector origin components) can be viewed singly or in combination with other layers. The system is interactive allowing individual layers to be manipulated at all times. For example, image content data can be copied or moved from one layer to another.

The system has been designed not simply with "design" only in mind but to allow platemaking and to incorporate production constraints inherent in specific types of printing presses which will be used for printing the documents. For example parameters may be defined which warn the designer if serial numbers are being placed in position which would fall outside a given printing press's tolerances. These parameters are stored as data by the apparatus. It can also incorporate design constraints. For example parameters may be defined which warn the designer if non-standard paper sizes or colours are being employed. These parameters will also be stored as data by the apparatus. Furthermore, the apparatus may allow a degree of positional tolerance of one image relative to the other. For example while four litho workings on each side of the document can be placed in very precise register, as they can from back to front, the registration from, say, litho to intaglio or watermark to litho, will be less precise.

The apparatus may allow the tolerance to be viewed by determining from the production tolerance data what the positional limits are and presenting a set of images at either extreme or without any offset.

This is useful because the designer can then see if a particular effect will in fact blend when its relative position varies. Similarly the precise positioning of the watermark and thread will vary from note to note, but within known limits. By reference to a set of predefined data the apparatus may allow a warning to be given if the designer tries to exceed the production limits.

By using the image content data alone, the system also allows output of the image data alone, without colour, for example to allow black and white negatives of the layers to be prepared for platemaking purposes. Alternatively the output device e.g. a laser or high precision plotter, might be used to image or engrave plates directly. In this case the vector data employed in the high resolution plotter may be retained ready for production use with the pixel equivalent image used for image manipulations. The complete apparatus need not be present on one site. Completed design data can be sent to other sites by data communication means, if necessary protecting the data using encryption, to allow proofing at an overseas location.

Other capabilities which can be represented electronically include a) image reversal capability; this is to allow face to face, i.e. front to back registration, of major importance in the design of most security documents. The image reversal capability may be operated by firstly choosing an image data set which will be in pixel form, secondly defining the axis of transposition for that image within the positional reference frame and then operating a routine which sequentially transposes the image content data of given pixels to the transposition positions thereby creating a new data set of the transposed image, which may be stored and further electronically manipulated. In most cases the transposition will be undertaken about a vertical line running midway down the middle of the area of the document. The colour will change according to the new position of the pixels.

The image reversal capability may be used to cause images to face in the opposite way, to provide mirror images and to provide a registration guide for complementary images such as see-through or print through images which are printed in close register on both faces of a note. Where two images are required to be in register from one layer to another, they may be so identified so that a subroutine can move the complementary image automatically to maintain register when the first part is moved.

b) Orlof capability: the system allows the designer to create an image which suddenly changes colour. For example a line may cross the note. In the middle it will suddenly change from one colour to another. To achieve this the line portions have to appear in precise register in two different colour layers. This is an important and unique feature. The Orlof capability may be operated by firstly creating the complete image within one layer, defining a colour splitting line which cuts the image and electronically transferring that part of the image corresponding to the second side of the splitting line to a second layer so that may be coloured differently while retaining the first part of the image at the first side of the splitting line in the first layer, and colouring it. The colours chosen for the first and second image portions will be different. By providing the splitting of the first and second images against a fixed frame of positional reference, close register of the first and second images in their respective first and second layers may be achieved. A simple procedure may also be employed to allow the splitting line to be moved in either the first or the second image such that the image data is automatically transferred from the first portion to the second portion or vice versa. The designer may thereby experiment with the effect until the optimum splitting is obtained. The whole design area may also be translated in position from one part of a document to another by using a subroutine which maintains registration.

c) Fade capability: the system allows image content to change from one colour to another. Thus a word printed in the horizontal may have a diagonal colour wave, say, allowing the top right hand corner to be turquoise and the bottom left to be green with a gradual transition between the two (rather than a sudden Orlof type change). The fade capability is somewhat similar to the Orlof capability in that two image portions abut but in this instance, instead of a specific splitting line being employed, the apparatus allows a splitting band to be defined such that the adjacent colours merge within the band in a visual manner akin to the effect of rainbow printing.

The orientation and width parameters of the band may be determined by the designer.

d) The system can also have or import data from a by microlettering capability by using the image content data facility. This will allow lines to be created which on and magnification will be seen to contain alphanumeric characters, symbols, logos and the like, for example, the name of the issuing Bank continuously repeated in fine lettering. The microlettering capability is operated by creating a character set, such as alpha numeric characters, symbols, lines and other indicia, and presenting that in positive or negative usually in a line format. A repeat frequency of the image is usually declared such as if the name of a bank is to be indefinitely repeated along the line. This may be implemented by using a step and repeat procedure to create the line, which may then be positioned with a reduction scale factor applied so that the effect is of a line. In the proof or on the screen the line may be represented apparently as a normal inked line with the microlettering text presented in negative against a background or as a positive. The line may be employed as a framing line. While if very small the microlettering may be unresolved on the colour monitor or the proofing printer, the design apparatus may allow portions of the document to be exhibited magnified. In such instances, the data set corresponding to the microlettering may have an apparent resolution greater than is provided by the resolution available over the rest of the document.

Microlettering may be provided on security thread simulations either by providing positive or negative images. It is also possible to position a number of lines together using a step and repeat routine so as to cover an area. This filling type of routine may also employ the facility of causing the set of lines to follow a curve or other geometric design.

e) Through the use of layering within the image content data the system can have a duplex/triplex capability; this will allow creation of a complex design component extending in precise register of line and colour over a few layers. Duplex and triplex elements occur where there is a geometric pattern such as a grid made of lines, into the cells of which are separately printed in precise registration colour patches which have the shape and size of the cells or are slightly smaller. One part of the design is common to both portions such that when printed that the second printing of the one part overlaps the first, resulting in a third colour. This is very difficult to reproduce commercially using conventional techniques and there may be see-through or print-through associated printing on the reverse of the note. Any design may be imported into various banknotes as a common element, either from a pixel image store or from the pixel equivalent of a vector design. The duplex/triplex procedure allows complementary portions of a given design feature to be allocated between two layers, each of which is held in precise and complementary register such that both parts may be given different colours. Preferably a procedure is employed to cause the movement of the other part of the image to maintain register if the first part is moved.

The splitting of a composite triple image into its individual components allows a triplex image to be simulated.

f) See-through printing occurs where two faces of, say, a bank note are printed with precisely complementary images such that on viewing the note from one face the printing on the opposite face of the note does not significantly appear. Print-through printing occurs where the printing on a part of one face of a note is complemented by similar but non-identical printing on the other face of the note such that on viewing from one face of the note the printing on the other face can be seen accurately to be in register.

The apparatus of the invention allows this effect to be simulated by providing an image reversal routine as described previously which then may be used in colour muted form to provide the basis for viewing the feature from the other face of the note. The analogy with duplex printing will be apparent. A positional translation procedure may be employed such that when the designer moves one part of a see-through feature or a print-through feature, the coordinates of the complementary image data of the other layer area are automatically changed.

g) A further software routine may be provided to take a specific outline and then provide a series of margins of different colour around that shape.

Thus, the system allows the outline to be defined and then after saving of the outline, a margin is radially defined with a specified width.

This margin may be saved as an image and given a specific colour. Further margins may also be provided if necessary, the width of the margin reflecting adjacent design features by providing a routine which assesses the distance from the perimeter to the edge of the note or to an intervening design feature on a radial basis and using that to determine the size of the margin. Multiple margins may be formed to provide a series of 'growing outlines'.

h) Medallion effects may also be represented. Medallion effects are created by the designer by causing a stylus to track over a three dimensional surface. The upward movement of the stylus causes the connected drawing stylus to be deflected within its drawing plane by an amount which corresponds to the vertical deflection of the first stylus. Within the apparatus of the invention this effect may be represented by using a segment of a line corresponding to a notional upward deflection to be slightly displaced in parallel to the line by an amount proportionate to the extent of notional upward deflection.

i) An image interrelation feature can be achieved to allow a defined area to be specified which covers identical or complementary images found in two or more layers such as are described with see-through effects. By linking the two images it is possible to secure the following of the second image to the translational movement of the first image. This is achieved by providing a routine which changes the position of the second image within its image store. If necessary, this may be done by defining only a portion of a given layer and moving that rather than securing movement of the whole layer.

Another problem with handling graphics for security documents arises from the manner in which security documents are printed. Thus, typically, a security document is printed in a series of separate print operations some of which involve the laying down of a printing ink which, in many cases, will overlay all or part of a previously printed ink. In the past, when a computer generated proof has been produced of a security document image it has been assumed that the most recently printed ink completely obscured all inks printed beneath it and thus a gating system was used in which only the colour of the topmost ink was printed on the proof. Such a system is described in GB-A-2180427 and EP-A-144138. With the present invention the contribution of underlying layers to the resultant colour is recognized.

Examples of different types of operations which can a produce an image on the finally manufactured document include:

intaglio printing, lithographic printing including wet and dry offset methods, letterpress printing including serial number printing, screen printing, gravure printing, flexographic printing laser induced colour transfer printing, thermal element induced colour transfer printing, laser induced colour generation imaging (positive or negative), thermal element induced colour generation imaging (positive or negative), electronically applied colour pen imaging, electronically applied ink jet printing, electronically applied bubble printing, electronically applied ribbon printing, xerographic imaging, embossing, and label affixing (including hot stamping of transfer films and foils).

Other factors which may be simulated include watermarking, fibre, planchette and thread provision ie. the image is provided during creation of a substrate. The images could also be normally invisible in the final security document, as described below, but selectively revealable.

The invention is particularly suited to the production of proofs by electronic printing. Preferably, the processing means is adapted to generate from the image content and colour data proofing control signals defining the corresponding image or combined images in terms of proofing inks or dyes. Typically, the proofing inks comprise two or more (preferably all) of cyan, magenta, yellow, and black.

Preferably, the deposited proofing ink densities are defined on a multiple level scale having at least three values, more preferably at least ten. Further, the electronic printing operation (for generating a proof or final product) preferably comprises depositing a quantity of ink in each area corresponding to a pixel, the quantity of ink deposited corresponding to the data value for the pixel.

In conventional digital colour proofing, each output pixel is either printed with a full, single density ink value or not printed, thereby simulating halftone printing. This halftone proofing process involves significant loss of image content information and is less likely to withstand inspection under magnification. We have appreciated, however, that with the complex images which are devised for security documents, it is particularly necessary to be able to generate a proof with a similar colour resolution and colour accuracy to the finally printed document. We have appreciated that this combination of better resolution and better colour accuracy can be achieved by printing the proofing inks at a variety of different densities. Typically, there will be at least five different density values, more preferably twenty values, and most preferably at least thirty values. However, even larger values such as 256 could be used. Different densities may be achieved by applying ink to different areas.

This extends the available colour range to several thousand different colours and offers almost continuous tone capability. In one preferred arrangement, an ink jet printer is used to generate the proof since this can deposit accurately controlled quantities of the proofing inks to represent different density levels. The difference in density is achieved by varying the thickness and/or size of the deposit according to the desired hue.

In the preferred arrangement, the apparatus further comprises a framestore for connection to a monitor, the processing means being adapted to store the combined image content and colour data in the framestore in a manner suitable for controlling the monitor.

Typically, the data stored in the framestore will define monitor colour components such as red, green, and blue. These will usually be different from the printing inks when a full document is displayed on a high resolution colour monitor the exhibited resolution will generally be less than that inherent in the primary data store of image data. This primary data store is used for proofing out put, rather than the derived framestore data.

Security documents generally possess a series of different measures for authentication and against counterfeiting. Some of these will be immediately viewable and will be primary proofing images, and others, secondary images, will be revealable to the eye such as fluorescent inks revealed by the use of ultraviolet light, photochromic inks temporarily revealed by high energy light exposure, thermochromic inks revealed by heating, metameric inks revealed by the use of a suitable viewing filter such as an infrared filter for a pair of red metameric inks, and chemically responsive inks and coatings. Other secondary images will be detectable only by machine sensing such as magnetic inks whether their overall deposition or codable areas, X-ray opaque inks and spectroscopically revealable inks. Penetrating inks in which there are two components one which colours the surface, and the other which colours the underlying area and perhaps border of the overlying component may also be used particularly for serial numbering.

Metallic inks and the above revealable effects will not be reproducible directly by the proofing method which will generally employ only conventional coloured inks. Such secondary effects may however be shown on a complementary series of proofs where the secondary effect areas are identified in distinguishing colours to show their position and such colour effects as the inks provide.

Many documents will contain metallic ink printing to provide a defence against copying. Normally metallic areas in a proof will be shown in distinguishing colours but in certain instances it may be possible to obtain a proof by imaging a metallised substrate such as a substrate previously printed with metallic ink in the appropriate area.

The system can thus provide proof of prints which provide a visual indication of the location of concealed features such as the invisible fluorescent inks mentioned above. These concealed features may be printed in any suitable identification colour and may simply be printed on an otherwise blank document shape or on a version of the otherwise complete document except that any visible colour associated with the marking will be replaced by the colour identifying the presence of a concealed feature. In the case of photochromic inks which can be assigned two visible colours then these two colours can be used.

Thus an advantage of the system is that it can not only reproduce special printing colours but also give a visual indication of the presence of special materials.

Proofing may occur on white paper, or tinted paper or indeed on paper which carries a real marking such as a watermark or thread or metallic foil (optionally embossed or embossable) label and all these can be simulated by suitable image content and colour data.

A feature which is sometimes incorporated into a security document to impede copying is a rainbow printed design. Rainbow printing is a term used widely in the security printing industry. What is meant is that two inks are provided in a common ink duct separated by a divider. As the press turns the two inks are delivered into their respective parts of the inking train. As a result of the lateral oscillation of the inking rollers in the train the two inks are blended in the inking train to form a continuous gradation of colour across the blending band. The ink thus mixed on the inking train is offered to the ink receptive surface of say a lithographic printing plate with the result that an image stretching from one pure ink colour to the other across the band becomes inked in a banded manner and this banding is transferred to the substrate via in offset lithography a blanket. This effect is difficult for counterfeiters to produce.

In any press there may be more than one pair of inks blended so that across a given document there may be two or more bands.

In one highly preferred example of the invention, rainbow images can be represented by storing in a second store digital data defining one or more colour bands for some of the layers in which there is a gradation in colour, wherein the data defines respective ones of the printing inks in pure colour form in unmixed regions of the band and represents gradient combinations (eg. linear or logarithmic) of the inks between the unmixed regions.

In this new system a single layer may be arranged to exhibit rainbow printing effects by creating two or more separated colour bands of different colours and allowing the colours to merge in gradient fashion between one band and the next. The position and width of each colour band is determined by the operator and the band colours are selected from the available range of predetermined, ink matched colours. Colour in the band between the two predetermined colours (or where they overlap if abutting) is then calculated by means of a mathematical gradient expression.

In simplest terms the colour contribution of the expected printed colour density from the first of two abutting inks in the ink duct varies on the printed document from its unblended (maximum) value at the first edge of the first blending band and this linearly decreases to nothing at the far edge of the blending band. Similarly the colour contribution of the second colour is allowed to decrease linearly in the opposite direction, if necessary taking account of the different ink spreading characteristics. By combining these colour contributions and taking into account weighting of the colours on underlying layers, the final colour is calculated per pixel and stored. RGB values are used for display and for correlation with the ink jet printer YMCK parameters.

The gradient of colour change in the blending area may be of a linear or other simple mathematical nature or made in a series of steps.

Reference data or mathematical expressions may also be provided to allow colour calculation where one rainbow impression is placed over another. For example there may be masking factors assigned to each ink depending on its opacity as previously described.

Rainbow bands generally run parallel to one edge of the final document and will appear as horizontal or vertical bands.

The processing means may be adapted to generate from those data sets representing printing operations, control data for controlling the manufacture of a printing plate.

The stored image data may be used for platemaking i) by writing directly onto a plate for each layer e.g. by laser;

ii) by exposing a photographic film which is then used as a mask for platemaking e.g. by laser;

iii) by outputting data to a subsidiary computer controlled platemaking system e.g. by laser; or iv) by outputting to a vector plotter or pixel plotter.

DESCRIPTION OF THE DRAWINGS

Some examples of methods and apparatus in accordance with the present invention will now be described with reference to the accompanying drawings, in which.

DESCRIPTION OF THE PREFERRED EMBODIMENTS

Figure 1:
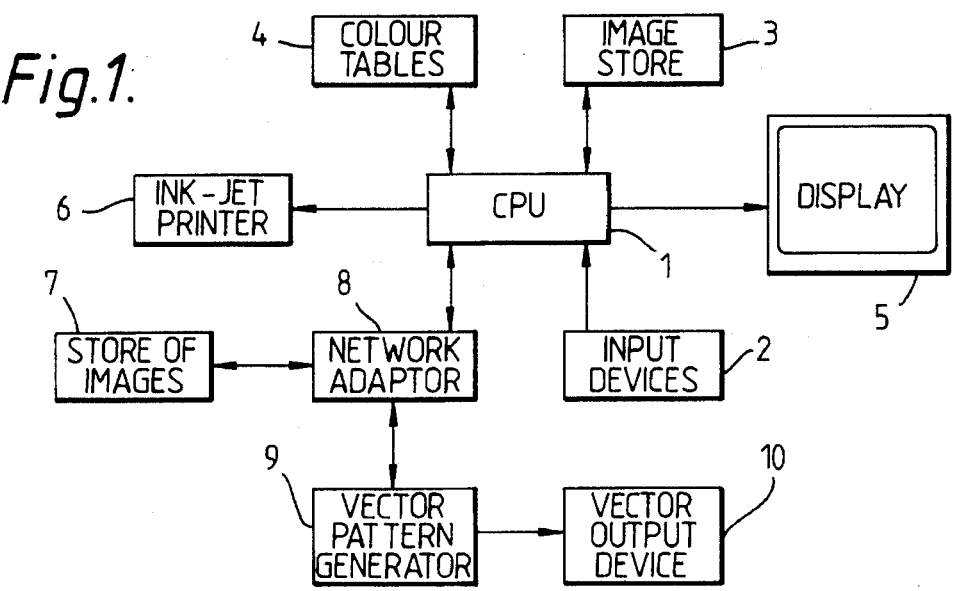
FIG. 1 is a block diagram of one example of the apparatus.

The apparatus shown in FIG. 1 comprises a processor 1 which is controlled by a user via one or more input devices 2 such as a keyboard or digitiser. The processor 1 accesses image content information in an image store 3 and colour data in look-up tables 4. Images can be viewed on a monitor 5 coupled with the processor 1 and proofs can be printed by an ink jet printer 6 coupled with the processor 1. A further store 7 is provided for storing a library of previously created complete or partial images, the store being connected to the processor 1 via a network adaptor 8. In addition, the processor 1 may be connected to a vector pattern generator 9 such as a laser source, to make film masks for platemaking in a vector output device 10.

Additional devices may be connected via the adaptor 8 with the processor 1 such as raster image input devices selected from a colour raster scanner, a video camera and the like which enable a raster colour separation of an original image into red, green and blue components; or vector input devices for example selected from a pressure sensitive stylus operated digitising tablet, a tablet and puck, a mouse, or a vector input from a separate computer system. The apparatus is particularly suited to the proofing of security document printing images such as banknotes.

The designer will use the video display unit monitor 5 to display aspects of the design. The screen will give a colour representation in red/green/blue phosphor the emissions, which is matched to the original colours and that of the final inks. The screen-to-final-ink matching is less critical in colour accuracy and resolution than would be needed from proof-to-final-ink.

The designer is able to view individual print impression layers or images and composites including the completed note.

The designer is able to incorporate both raster information and vector information. Vector information such as that arising from the use of high resolution pattern generating equipment which may output by driving a laser beam to record on photochromic film geometric line patterns, is less consuming of computer memory but requires conversion to raster (i.e. pixel) information.

The system is provided with a "scratch" layer in which to create graphic layouts from either vector or raster inputs, which then can be transferred to a specific ink impression layer or other feature layers.

Figure 2A:
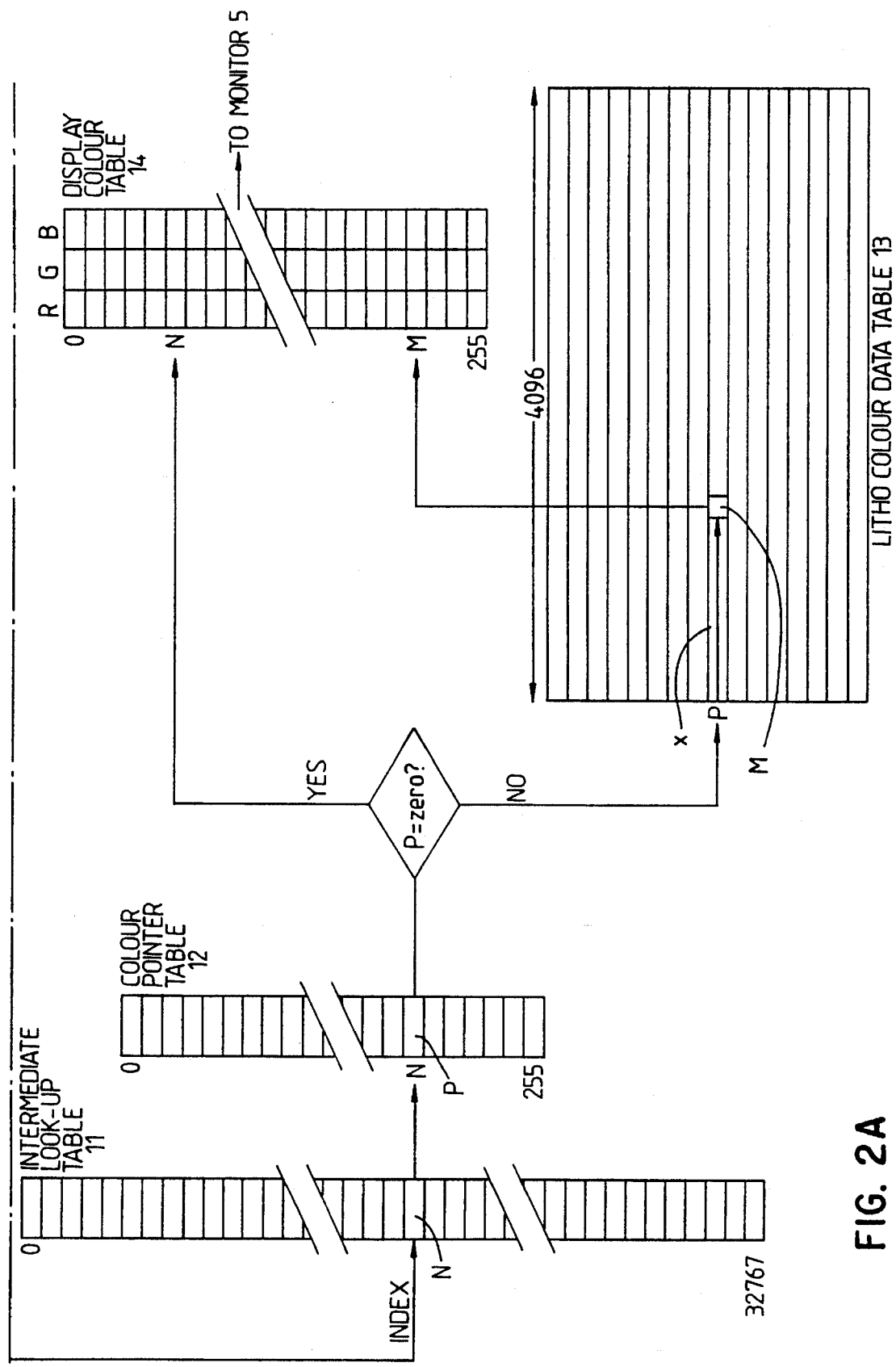
FIG. 2 illustrates schematically the arrangement of the image store and colour look-up tables shown in FIG. 1.

The scratch layer will permit origination unconstrained by print related features. Thus the scanned raster data and mathematically constructed vector data may be loaded from a network and manipulated vector data being subsequently converted to raster and merged into another layer. FIG. 2 indicates schematically the image content store 3. This store 3 (the Virtual Image Store) contains a location for each pixel of the resultant design at the highest resolution required (the Virtual Image). Each pixel is defined in terms of a sixteen bit (two byte) data value with each image (or layer) which is to be displayed or subsequently printed represented by one or more bits. This is shown in FIG. 2 where

| Bit No. | Image Type |
|---------|------------|
| 0,1 | Paper including Watermark, etc |
| 2 | Litho 1 |
| 3 | Litho 2 |
| 4 | Litho 3 |
| 5 | Litho 4 |
| 6,7,8 | Intaglio (DP) |
| 9 | Letterpress |
| 10 | Invisible Print |
| 11,12,13 | Scratch |
| 14 | Layout |
| 15 | (unassigned) |

One of the advantages of the invention is that any one single layer can be viewed or proofed alone or a combination of layers can be viewed or proofed. Accurate colour rendering is achieved by the use of procedures that examine the layers currently selected for viewing or proofing and automatically set the appropriate colours in the display framestore or print file.

Display resolution is generally lower than that of the Virtual Image, so it is only possible to display a subset of the Virtual Image pixels on the monitor 5. When viewing the whole image on the display this is achieved by sampling the Virtual Image pixels at an appropriate ratio. For example, if the Virtual Image contains approximately 4000×3000 pixels and the monitor resolution is 1024×768, then every fourth pixel is displayed from every fourth row.

Typically, up to 256 different colours can be displayed by a monitor at any one time. In the case of the display of a single image layer, a reasonably accurate display can be achieved. However, when more than one layer is combined it may not be possible to display all of the resultant colours so accurately and a procedure has been devised to make best use of the available colours. This procedure for assigning display colours comprises two stages: Setting up the colour tables, and updating the display. FIG. 2 illustrates in more detail one arrangement of the colour tables 4 shown in FIG. 1. The following data structures are used:

a. The Display Colour Table—DCT (14). This typically has 256 entries, of which about 40 are used for the fixed ink colours chosen by the designer, about 200 are allocated dynamically to the colours produced by blending in rainbows and transparent layer overprinting, and the remaining 16 are reserved for displaying menus, cursors etc.

b. The Intermediate Look-Up Table—ILUT (11). This has 32,768 entries, indexed by each of the possible combinations of the 16 bits that represent each pixel. The contents of each location in the ILUT are dynamically allocated to indicate which entry in the Display Colour Table 14 should be used to represent the appearance of a pixel whose bit pattern corresponds to that location.

c. The Litho Colour Data Table—LCDT (13). This comprises a set of one-dimensional arrays, each having as many entries as the number of horizontal pixel addresses in the Virtual Image, typically 4096. The set contains one array for each possible combination of litho layers in which colour blending and overprinting are to be represented. For example where there are four such litho layers, sixteen arrays are provided in the Litho Colour Data Table.

d. The Colour Pointer Table—CPT (12). This has the same number of entries as the Display Colour Table. Entries are either set to zero, meaning that the corresponding entry in the DCT(14) is valid, or contain a pointer to one of the Litho Colour Data Tables.

These colour tables are initially loaded with default values, and are updated each time the operator changes any of the ink colours, or changes the position or width of any of the colour blending regions, or changes the combination of layers to be displayed. The updating procedure is as follows:

First, the Display Colour Table 14 is loaded with predefined RGB data for the fixed colours of inks and paper that the designer has selected. These will normally occupy the first 40 or so locations in the table.

Next, the number of different litho colour blends and overprints is counted for the currently defined rainbow band splits and the currently displayed layers. The 200 available entries in the Display Colour Table 14 are then allocated to these combinations and the actual colours are computed according to appropriate conventional blending and opacity algorithms.

The contents of the Litho Colour Data Table arrays 13 are then set so that each location contains the index M of the entry in the Display Colour Table 14 that corresponds to the colour for that horizontal position and combination of litho layers.

The Intermediate Look-Up Table 11 is then set up. For each location in turn, the layer combination that it represents is examined to determine whether the topmost layer of those currently selected for display is an "opaque" layer (i.e. Layout, Scratch, Invisible, letterpress, DP or Paper). If it is, then that entry is set to the DCT value (in the range 1 to 40) corresponding to that layer's ink colour. If on the other hand the topmost displayed layer is a litho layer, then its ILUT entry is set to the DCT value (in the range 41 to 240) corresponding to the leftmost colour for the currently displayed litho layer combination. (This is a provisional setting only - the actual colour to be used will later be determined by reference to the LCDT).

Having set up the colour tables, the display is updated. For each pixel that is to be displayed, its 16-bit value is used to index the Intermediate Look-Up Table. The value N (which will be in the range 1 to 256) found at that ILUT index is checked against the contents of the Nth location in the Colour Pointer Table. If the CPT entry P is set to zero, then the pixel is assigned the colour contained in the Nth location of the Display Colour Table 14. If the CPT entry P is non-zero, then the x-coordinate of the current pixel address is applied to reference the appropriate array P in the Litho Colour Data Table 13 for the currently displayed combination of litho layers and the contents M used to index the Display Colour Table 14 for that pixel.

As explained above, the data stored in the virtual image store 3 can originate from a vector pattern generator 9. If the Scratch layer is selected for display and vector mode is active then any such vector data is converted in a conventional manner to bit map form and then drawn onto the screen In addition, the vector data may be stored in the store 7 and can be used directly to produce printing plates as indicated in FIG. 1 by the output device 10.

The procedure for creating a print file for proofing is much simpler. The resolution of the printer will generally be the same as that of the Virtual Image so that every pixel will be printed. Also the printer will generally accept colour signals with the same data resolution as that which is used to define the ink colours in the ink colour database (not shown), i.e. one 8-bit byte for each of three components. These components will generally be RGB, or YMC with optionally K, but any other triplet system of colour specification (for example Hue, Saturation and Lightness) may be used with appropriate mapping tables.

To define the colour of each pixel in the print file, its 16-bit value 15 (in FIG. 2) is masked to remove the contribution of those layers not currently selected for printing. If the topmost printed layer is a litho layer, then the colour of that pixel is computed according to its x-coordinate, taking account of the position and extent of any blends and using the litho ink colour data and opacity factors for the active layers. Otherwise, the colour of the topmost layer to be printed is deemed to be opaque and its colour definition is used alone.

The scratch layer may have a masking-by-colour feature. Thus areas can be "masked" according to their colour so that they cannot be overprinted by colours with a lower mask number.

Although the system may present all of the front and back layers to the designer at one time it has been found useful to work on one side of the note, typically with six layers, and then save that data before working on the six layers of the other side, taking into account front-to-back registration by, say, the reverse of one layer from the opposite face.

The apparatus thus allows the design of a variety of document faces which are comprised of one, two, three, four five, six, or more images depending on the requirements of the document under design.

Thus for the above structure the electronic layer available to the designer for one side may be:

1. Layout layer (for defining the dimensions and registration of the item)
2. Scratch layer
3. Serial numbering; monochrome or ie multicolour/letterpress;
4. Security design; invisible fluorescent/litho; letterpress
5. Security design; rainbow, monochrome or multicolour/intaglio;
6. Security design; rainbow or monochrome/litho,
7. Security design; rainbow or monochrome/litho;
8. Security design; rainbow or monochrome/litho;
9. Security design; rainbow or monochrome/litho;
10. Base paper (including watermark and thread)

Each of the above will be independently viewable and proofable as will specified combinations. Vector images are defined in a separate layer (e.g. the scratch layer) from which vector objects are then "painted" into the desired layer in raster mode only.

There may also be invisible or other hidden feature layers.

Thus the image of one layer on one face of the note may be transferred in left/right reverse mode (i.e. the rear view), temporarily to one of the layers of the second face of the document to allow accurate relative positioning. In general it is only required to check see-through features and intaglio placement and it is adequate to undertake this with one layer at a time. It is however conceivable to use the composite of the whole side or a selection of layers.

The system will allow each face of the note to be viewed and proofed in full colour. When the layers are viewed in combined format means are provided to ensure registration of the front layers with the back.

Colour fidelity is important in colour proofing and the processor 1 is able to improve upon the known gating method in which one overlying colour takes absolute precedence over another. In the new system, a series of comparative data are provided which allows the overall effect of overprinting one colour with another to be accommodated.

This data is prepared by providing via colour microdensitometry a series of data relative to the densities of each printing ink which is to be used and then providing a further series of data from inks at various densities and in various orders of printing. This is then related to the proofing printer ink densities and optionally the video display unit appearance. When pixel colour parameters are determined in the design, the combination of those layers and colours is then matched against the data to allow the empirical colour then to be provided to more accurately represent the true tones.

The colour balance may be achieved by use of reference data tables or alternatively from mathematical combinations, or by a combination of the two techniques.

Thus in any given impression layer rainbow printing may be achieved by colour calculation (or reference data). In any composite image of say a final banknote design the contributions of colour from underlying layers may be taken into account by reference to data tables or mathematical combinations.

The use of colour correction data enables accurate proofing colour reproduction of the designer's colour crayon drawings, the lithographic, letterpress and intaglio inks, the paper colours and security features contained therein.

To do this the colour crayons, the YMCK proofing inks at various deposition settings and the printing press inks at various thicknesses are measured by colour separation microdensitometry which then gives a common comparative basis for correlation. Such measurements also take account of one colour deposited on top of another. If a composite colour value is determined for a pixel by the computer a search is made to see if there is a corresponding, say ink jet value which allows determination of the actual ink jet settings to be used for proofing that pixel. If there is no precise value, an approximation may be made automatically from neighbouring values, although care has to be taken where the neighbouring values are white.

As an alternative, colours may be given masking values. Thus this allows YMCK to be overprinted only if the top layer YMCK colour has a higher masking value.

The input information may be in raster or vector format. The final output must be in raster format for the colour proofing equipment although any vector information can be retained for subsequent use or modification as the design develops.

The colour proof may be prepared by using combinations of four colours (that is yellow, magenta, cyan and if necessary black) which are deposited in precise registration on the proofing paper by a four colour ink jet printer which operates in a matrix fashion (as distinct from continuous tone or halftone). An example of such a printer is the Iris ink jet printer made by Iris Graphics Inc., USA as incorporated in the Crosfield Electronics Limited jetproof proofing system. The composite colour data allows multilevel control of the quantities of the jetted inks to be deposited, for example by providing 31 steps of drop size for each ink colour.

The system may also be coupled to image recognition equipment, such as a CCD array detector arranged to capture either a security printing plate, or security printed (completely or partially) substrates. By use of suitable comparative circuitry the captured images can be compared with the designed image to allow automatic document inspection at any stage of the process.

The colour proofing images which may be obtained from the apparatus via a colour printer, such as an ink jet printer, may be presented in different ways.

In most circumstances printed metallic inks will have to be depicted in a suitably distinctive colour as metallic proofing inks are not readily available.

Although somewhat difficult to prepare in a proof, the system has the inherent capability of handling materials which have degrees of optical variability. The ability to illustrate the position of simulations of such features in proofs which have been printed on special paper is potentially useful because of the use of special features in security documents.

Examples of optically variable features include metallic or coloured metallic printed portions;

metallised portions (e.g. threads or metallic labels such as hot stamped labels);

coarsely embossed metallic print or metallised portions which Way include the deposition of ink in the embossed pattern, or may be embossed without ink (such as latent and transient images whether single or multiple, or these images accompanied by a touring line) embossed metallised portions (including holographic effects), diffractive graphical patterns, diffractive geometric patterns and matrices of these);

optically variable ink portions comprising thin film optical interference coatings;

photochromic portions in which the visible appearance changes after light exposure;

thermochromic portions in which the visible appearance changes as the note is warmed;

solvatochromic effects in which the visible appearance changes as a result of contact with solvent, infrared revealable ink combinations, revealable when different viewing filters are used on the real document.

In all of these cases the appearance of the image can change for one reason or another. The design system may hold data for the changed appearance, for example before and after exposure colour of a photochromic material. In the case of materials which gradually change appearance the data can be modified by colour mixing computational routines or the like.

As well as for embossed images where the lines are discernable such as in latent images the embossed pattern may be enhanced by a shading or shadowing routine to enhance the visual perception of the effect.

Certain features will possess angular variability, that is their appearance will change depending on the angle of viewing. The system may be provided with a three dimensional instruction set which would allow orthogonal projections to be viewed from an oblique viewing angle. Such routines may use stored or calculated data to give a three dimensional optically variable effect. Such computations are however complex and the capability is unlikely to be used for the majority of designs.

By use of such three dimensional methods it is also possible to arrange to view intaglio printing as relief effect whether on the whole note or simply the intaglio printed layer.

The system may incorporate video effects which are used solely for the monitor display, to indicate reflective metal or diffraction of white light. If necessary these video effects may be kinetic in nature. Such effects may find use if the image information is to be displayed on a distantly connected monitor or, if the video display information is transmitted to a remote location.

The system may also take into account documents to which images are to be attached such as identity cards by providing means for including a specimen photograph, signature or fingerprint.

Many security documents are individually numbered so that every one from the security printed batch is rendered unique. The proofing system may accommodate this by showing representative numbers although any specified serial number can be printed, including using serial numbers in which adjacent number elements are in different font styles.

By reverse image manipulation the images on the printing plates may also be proofed.

Figure 3:
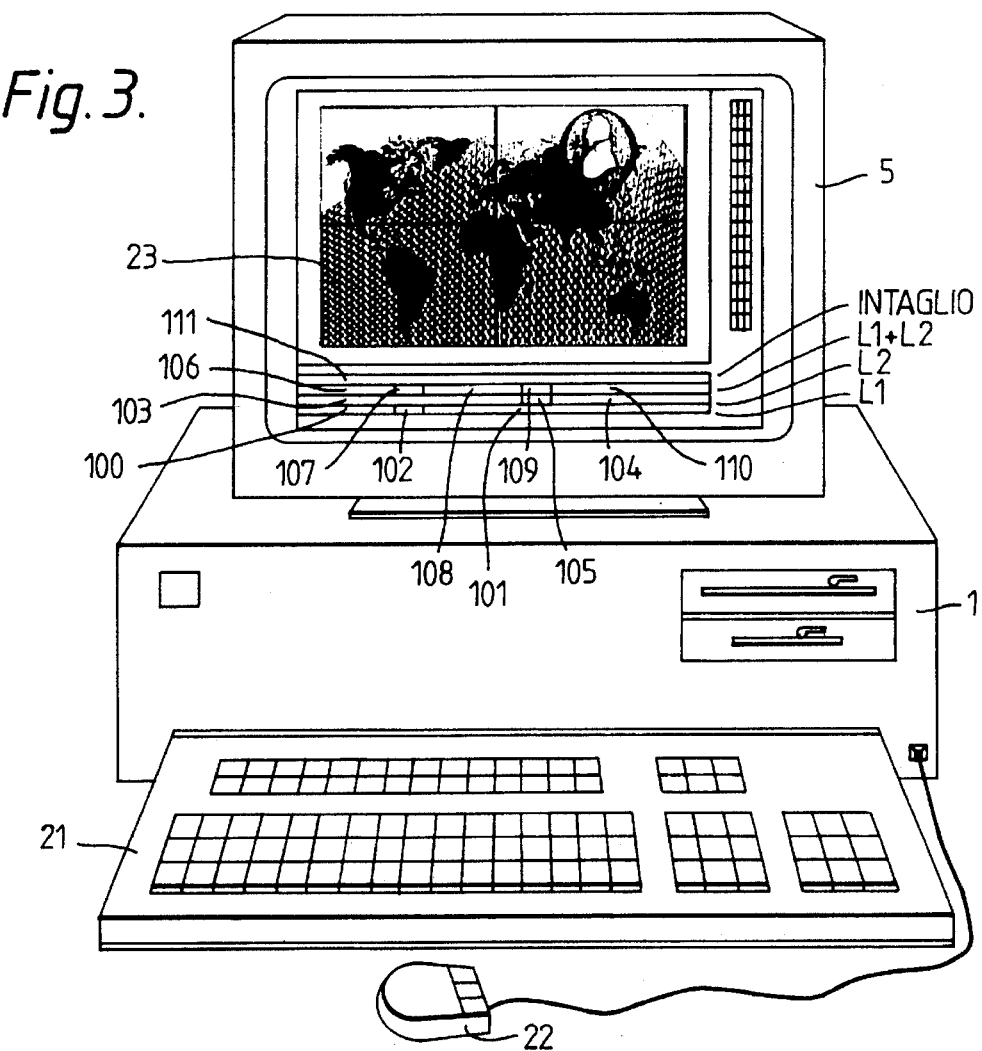
FIG. 3 illustrates a monitor and keyboard.

FIG. 3 illustrates this high resolution colour monitor 5 connected to processor 1 which runs the system software. A keyboard 21 and mouse 22 forming two of the input devices 2, are linked to the microprocessor 1.

Figure 4:
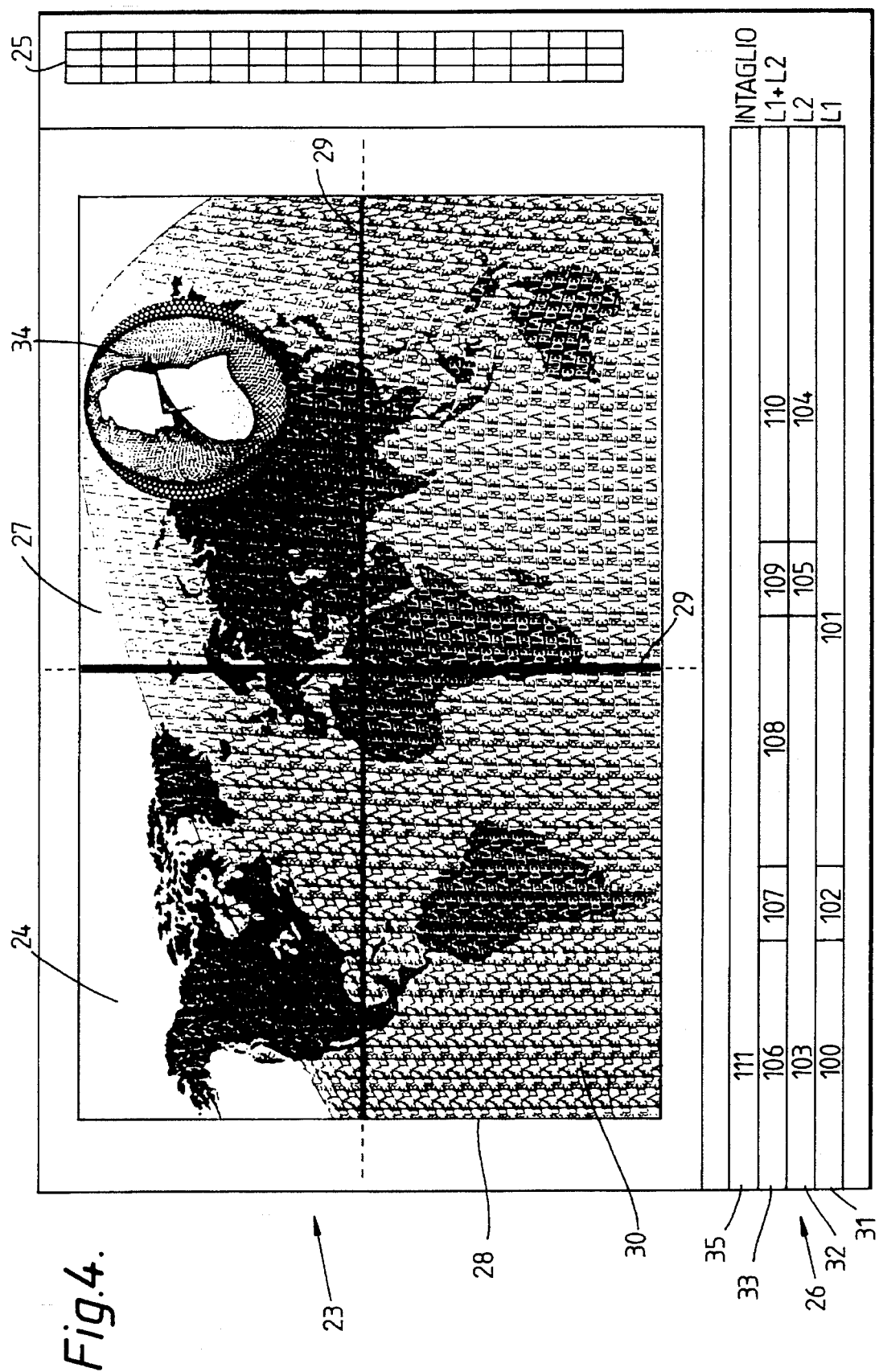
FIG. 4 illustrates an example of a monitor display.

In FIG. 4 the screen display 23 includes a window 24 for displaying the document being designed. Part 25 of the display 23 is reserved for system commands actuated by use of pointers under mouse control which allow the designer to choose a colour, to initiate a procedure such as reducing the size of a feature, and for general system functions including loading, saving and printing operations, usually via other menus.

An area 26 displays the linear colour arrangement for images and their combination.

The document 27 under design is confined within dimensions set in the layout layer and denoted by a perimeter 28. The layout layer is also in this instance causing the display of orthogonal centering lines 29.

There are three images displayed in the partially completed example document 27 shown. The first comprises the background largely text markings 30. This is to be printed by lithography employing rainbow printing layer L1. The initial ink colours and any limits of the rainbow bands are set by the designer at the bottom on the screen in the lowest of four horizontal colour defining zones shown at 26. The colour for markings 30 is given by the colour defined in linear array 31. Here the designer has chosen a first ink colour and assigned that to the block 100. A second ink colour is assigned to block 101 as shown and where they merge the system computes and represents the range of continuously blended colours in block 102. These continuously blended colours are stepwise approximated for display. Thus the image of the background areas 30 is coloured according to that set in linear array 31. If the image is moved laterally as the colour frame of reference remains fixed, individual image elements may take on new colours depending on whether they are moving into different colour areas.

The second lithographic image to be printed as layer L2 in the document is that of the "continents". This is essentially a solid image and where it does not overlie the printing of layer L1, the continent image adopts the colours defined in linear array 32 where a third ink colour is defined to be within block 103 and a fourth ink colour in block 104 with their multilevel blend of colours assigned within block 105.

Where the solid continent image L2 overprints the text of L1 as shown by the text lying within the continent areas, the colours resulting from the overprinting would take the colours of the weighted average of L1 and L2 computed by the processor 1 and shown in linear array 33. For example L1 may be allowed to give a twenty percent colour contribution. This array contains derived colour for example with the colour for over printing of images falling within blocks 100 and 103 resulting in their being given the colour assigned to block 106. By analogy colours of blocks 108 and 110 are similarly derived. Blocks 107 and 109 show respective averages of blends 102 and colour 103, and blends 105 with colour 101.

These X direction variations in colour are stored in the Litho Colour Data Table 13 (FIG. 2). One array of this Table 13 will be provided for each of the arrays 31, 32 and 33. If the selected layers of a displayed pixel has image content in one or both of the layers L1, L2 (as determined from the store 3) and does not contain an overprinting layer, then a value M (at the corresponding X location) will be selected from the array in the Table 13 corresponding to L1, L2 or L1+L2.

The document on display also includes an intaglio printing of a vector origin head design 34. Converted to pixel image form for display. The density of the intaglio ink such that if it prints on top of the underlying lithographic layers its colour which will be the fifth ink colour shown in array 35 and assigned totally to block 111, will obscure completely the underlying colours. In this instance the lithographic printed area would marginally overlap (not shown) into the edges of the elliptical perimeter of the vector origin design to allow for slight variations in registration during a printing run.

If the lithographic images were continuous under the vector design as it is now shown the intaglio image could be moved over the document and in each new position it would take the colour defined for intaglio ink in that location, the underlying images being suppressed.

In this example the variety of colours displayed is derived from only five standard ink colours. This allows an unprecedented level of accuracy in colour image reproduction of security document to be attained.

The colour assignment for a proofing print will usually be made by resorting to the originally defined (8 bit) colours corresponding to the pure inks and the colours defined by the layers L1 to L4. into equivalent YMCK values. The large number of YMCK values may have to be limited by a YMCK proofing colour approximating procedure so that the pixel colours fall within the range of proofing colour values permitted. These values are then used to control the yellow, magenta, cyan and black inks in the ink jet printer 6. For example the individual Y, M, C or K values may fall within thirty two levels.

The system may also allow a screen dump so that a proofing print of the monitor screen may be obtained for example by converting the display colour data directly into YMCK values, but generally this will not be done if the proofing printer can print many more than 256 monitor display colours, thereby allowing a closer approximation to continuous tone colour.

The invention has been described with particular reference to banknotes but it may be used in the design and manufacture of a wide range of security printed documents, such as travellers cheques, bank cheques, bonds, certificates including certificates of deposit, identity cards, permits, licences, ownership document forms, financial transaction instruments such as plastic charge cards, credit cards, cash withdrawal cards and cheque guarantee cards, telephone or other service entitlement cards, vouchers, money orders, certificates of credit, access control cards, passports, visas, lottery tickets, entrance tickets, travel tickets such as airline tickets including multiple leaf booklets, stamps including fiscal stamps and brand protection labels.

In addition to individual colour proof sheets being produced by the system, it is possible to place on one sheet a number of proofing images. For example proofing images illustrating individual layers and their sequential composites as manufacture of the bank note progresses, may be shown. The ability, rapidly to prepare such progressive proofs, is a further useful feature of the system. Similarly it is possible to prepare a series of colour variations for a particular feature in one layer so that the best aesthetic qualities can be achieved for the final product.

A particularly useful aspect is the ability to offer not only true colour proofing images but also to provide alternative colours. An alternative colour is one which may exist under certain circumstances, such as in the case of photochromic inks. Alternatively it may be used to reveal the position of machine readable or discrete features, such as the printing of magnetic inks, metameric inks or invisible but ultraviolet (or infra red) illuminable luminescent inks.

The proofs may be presented at normal size or enlarged or reduced. Metallic effects and the like which are not readily achieved by current proofing inks may be simulated by use of a colour, eg grey to represent silver tones. Alternatively the proofing image may be placed in register on proofing paper which has already been given or subsequently given a special ink effect, such as metallic printed proofing paper stock or holographically labelled stock or threaded stock.

In summary proofing prints may represent on a single sheet.

1. one or both sides of a completed document with optionally the marking of hidden or secondary features:
2. individual images including the base paper images including hidden or secondary image positions;
3. the sequence of individual layers and their composites following the stages of manufacture of the document and the final document (that is a series of progressive proofs) with optionally the separate marking of hidden or secondary features; or
4. a portion of an imaged web at any stage of production showing multiples of the same document stock or combinations of documents.

A further important aspect of the invention that the processor can store a set of "rules" which constrain in a predetermined manner the way in which images may be placed in a design as well as the results of overlaying described above. For example, the rules may limit placement of a serial number to certain regions.

The computer program for controlling the apparatus in accordance with the invention may be run on a Sun Microsystems computer system comprising Sun 4 hardware and the Sun operating system, version 4.0.

Apart from the facilities already described, routines for which may be written by those skilled in the computer programming art, the system may also allow the presentation of ruling marks and measurement marks on the screen or the proofing printout which marks need not necessarily be held within the image data stack.

We claim:

1. Apparatus for handling digital representations of documents which are to be provided with one or more images, the apparatus comprising a first store for storing digital data defining the image content of each pixel of each image; color data generating means for generating data defining the color of each pixel of each image or combination of images as defined by a user, separate from the image content data; and processing means for selectively combining the image content data and color data to enable selected images to be viewed separately or in combination, wherein the color data generating means comprises a second store in the for of a look-up table which has an address corresponding to each possible combination of images within a pixel and contains at each address color data defining the resultant pixel color.

2. Apparatus according to claim 1, wherein the first store contains at least one binary digit for each pixel of each image.

3. Apparatus for handling digital representations of documents which are to be provided with one or more images, the apparatus comprising a first store for storing digital data defining the image content of each pixel of each image; color data generating means for generating data defining the color of each pixel of each image or combination of images as defined by a user, separate from the image content data; and processing means for selectively combining the image content data and color data to enable selected images to be viewed separately or in combination, wherein the color data generating means generates color data for at least one image which varies with position in one direction across the document.

4. Apparatus according to claim 3 wherein the color data generating means is adapted to generate color data for at least one image which varies with position in orthogonal directions across the document.

5. Apparatus according to claim 1, wherein the processing means includes means for adapting the combined image content and color data for use with a display device.

6. Apparatus for handling digital representations of documents which are to be provided with one or more images, the apparatus comprising a first store for storing digital data defining the image content of each pixel of each image; color data generating means for generating data defining the color of each pixel of each image or combination of images as defined by a user, separate from the image content data; and processing means for selectively combining the image content data and color data to enable selected images to be viewed separately or in combination, wherein the processing means includes means for adapting the combined image content and color data for use with a display device and the adapting means comprises a look-up table for storing control values suitable for use with the display device, the look-up table having an address corresponding to every possible combination of image content and color data value.

7. Apparatus for handling digital representations of documents which are to be provided with one or more images, the apparatus comprising a first store for storing digital data defining the image content of each pixel of each image; color data generating means for generating data defining the color of each pixel of each image or combination of images as defined by user, separate from the image content data; and processing means for selectively combining the image content data and color data to enable selected images to be viewed separately or in combination, wherein the processing means includes means for adapting the combined image content and color data for use with a display device and the processing means generates from the image content and color data proofing control signals defining the corresponding image or combined images in terms of proofing inks or dyes.

8. Apparatus according to claim 7, wherein the proofing inks or dyes comprise two or more of cyan, magenta, yellow, and black.

9. Apparatus for handling digital representations of documents which are to be provided with one or more images, the apparatus comprising a first store for storing digital data defining the image content of each pixel of each image; color data generating means for generating data defining the color of each pixel of each image or combination of images as defined by user, separate from the image content data; processing means for selectively combining the image content data and color data to enable selected images to be viewed separately or in combination; and a frame store for connection to a monitor, the processing means storing combined image content and color data for each pixel to be displayed in the frame store.

10. Apparatus for handling digital representations of documents which are to be provided with one or more images, the apparatus comprising a first store for storing digital data defining the image content of each pixel of each image; color data generating means for generating data defining the color of each pixel of each image or combination of images as defined by a user, separate from the image content data; and processing means for selectively combining the image content data and color data to enable selected images to be viewed separately or in combination, wherein at least one imaging operation comprises a printing operation and the processing means generates data which defines the color content of pixels of the corresponding image or combined images in terms of ink or dye densities.

11. Apparatus according to claim 10, wherein the printing operation comprises depositing a quantity of ink in each area corresponding to a pixel, the quantity of ink deposited corresponding to the data value for the pixel.

12. Apparatus according to claim 10, wherein the ink or dye densities are defined on a scale having at least three values.

13. Apparatus according to claim 12, wherein the scale has at least twenty values.

14. Apparatus according to claim 10, wherein each printing operation is selected from wet lithography, dry lithography, intaglio and letterpress printing.

15. Apparatus according to claim 14, wherein said printing operation is one of wet and dry lithography and wherein said processing means is adapted to generate at least one image with a rainbow effect.

16. Apparatus according to claim 14, wherein said printing operation is intaglio and wherein said color data defines schablones.

17. Apparatus according to any of claim 9, wherein the processing means generates control data for controlling the manufacture of a printing plate.

18. Apparatus according to claim 1, wherein each document is to be provided with at least one image.

19. Apparatus according to claim 1, wherein the processing means registers the images with respect to one another.

20. Apparatus for handling digital representations of documents according to claim 1, wherein the documents are security documents.

21. Apparatus according to claim 1, wherein the color data generating means generates color data for at least one image which varies with position in one direction across the document.

22. Apparatus according to claim 21, wherein the color data generating means is adapted to generate color data for at least one image which varies with position in orthogonal directions across the document.

23. Apparatus according to claim 1, wherein the processing means includes means for adapting the combined image content and color data for use with a display device.

24. Apparatus according to claim 23, wherein the adapting means comprises a look-up table for storing control values suitable for use with the display device, the look-up table having an address corresponding to every possible combination of image content and color data value.

25. Apparatus according to claim 23, wherein the processing means is adapted to generate from the image content and color data proofing control signals defining the corresponding image or combined images in terms of proofing inks or dyes.

26. Apparatus according to claim 25, wherein the proofing inks or dyes comprise two or more of cyan, magenta, yellow, and black.

27. Apparatus according to claim 1, further comprising a frame store for connection to a monitor, the processing means storing combined image content and color data for each pixel to be displayed in the frame store.

28. Apparatus according to claim 1, wherein at least one imaging operation comprises a printing operation, wherein the processing means generates data which defines the color content of pixels of the corresponding image or combined images in terms of ink or dye densities.

29. Apparatus according to claim 28, wherein the printing operation comprises depositing a quantity of ink in each area corresponding to a pixel, the quantity of ink deposited corresponding to the data value for the pixel.

30. Apparatus according to claim 28, wherein the ink or dye densities are defined on a scale having at least three values.

31. Apparatus according to claim 30, wherein the scale has at least twenty values.

32. Apparatus according to claim 28, wherein each printing operation is selected from wet lithography, dry lithography, intaglio and letterpress printing.

33. Apparatus according to claim 32, wherein said printing operation is one of wet and dry lithography and wherein said processing means is adapted to generate at least one image with a rainbow effect.

34. Apparatus according to claim 32, wherein said printing operation is intaglio and wherein said color data defines schablones.

35. Apparatus according to claim 27, wherein the processing means is adapted to generate control data for controlling the manufacture of a printing plate.

36. A security document proof manufactured by an apparatus, comprising:

a first store for storing digital data defining the image content of each pixel of each image, the security document being a composite having at least one image;

color data generating means for generating data defining the color of each pixel of one of a single image and a combination of images as defined by a user, separate from the image content data; and processing means for selectively combining the image content data and the color data to enable selected images to be viewed as one of a separate image and a combination of images, said processing means generating from the image content data and the color data proofing control signals defining the corresponding one of the separate image and the combination of images in terms of proofing inks and proofing dyes, wherein the processing means includes means for adapting the combined image content data and color data for use with a display device.

37. A security document proof according to claim 36, wherein the color generating means generates color data for at least one image which varies with position in orthogonal directions across the document.

38. A security document proof sheet having more than one security document proof thereon, the proofs illustrating the results of different combinations of imaging operations, wherein the security document proof sheet is produced by an apparatus for handling representations of documents which are to be provided with one or more images, said apparatus comprising:

a first store for storing digital data defining the image content of each pixel of each image;

color data generating means for generating data defining the color of each pixel of each image or combination of images as defined by a user separate from the image content data; and processing means for selectively combining the image content data and color data to enable selected images to be viewed separately or in combination.

39. A sheet according to claim 38, wherein the proofs illustrate the results of successive imaging operations, there being one proof for each imaging operation.

* * * * *